(12) United States Patent
Haertig et al.

(10) Patent No.: US 6,665,080 B1
(45) Date of Patent: Dec. 16, 2003

(54) METHOD FOR DETERMINING THE DEVIATIONS IN THE GEOMETRIC MEASUREMENTS AND/OR THE POSITION OF AN OBJECT FROM DEFINED DESIRED VALUES OF SAID GEOMETRIC DIMENSIONS AND/OR POSITION OF THE OBJECT

(75) Inventors: Frank Haertig, Pohlheim (DE); Ralf Christoph, Schoeffengrund (DE)

(73) Assignee: Werth Messtechnik GmbH, Giessen (DE)

( * ) Notice: Subject to any disclaimer, the term of this patent is extended or adjusted under 35 U.S.C. 154(b) by 0 days.

(21) Appl. No.: 09/890,264

(22) PCT Filed: Feb. 28, 2000

(86) PCT No.: PCT/EP00/01653

§ 371 (c)(1),
(2), (4) Date: Aug. 8, 2001

(87) PCT Pub. No.: WO00/50965

PCT Pub. Date: Aug. 31, 2000

(30) Foreign Application Priority Data

Feb. 26, 1999 (DE) .......................... 199 08 706

(51) Int. Cl.[7] .................. G01B 11/14; G01B 11/24
(52) U.S. Cl. ...................... 356/614; 356/601
(58) Field of Search ................... 356/614, 601

(56) References Cited

U.S. PATENT DOCUMENTS 4,977,526 A   12/1990   Jost et al.

FOREIGN PATENT DOCUMENTS

DE   3523188   1/1987
GB   2081546   2/1982

OTHER PUBLICATIONS

"KONTROLLE" Automatische Erfassung von Regel–und Freiform–geometrien fur Fertigung und Messtechnik, Dipl.–Ing. Wolfgang Grebe, Sonderdruck 10/96.

Primary Examiner—Frank G. Font
Assistant Examiner—Amanda Merlino
(74) Attorney, Agent, or Firm—Dennison, Schultz & Dougherty

(57) ABSTRACT

The invention relates to a method for determining the deviation in the measured geometric dimensions and/or position of an object from definable desired values of said dimensions and/or position. Before determining the deviations the measurement values of the dimensions and/or position of the object are adapted to the desired values, taking into consideration definable tolerance values of said desired values of the dimensions and/or position of the object.

9 Claims, 1 Drawing Sheet

Figure 1:
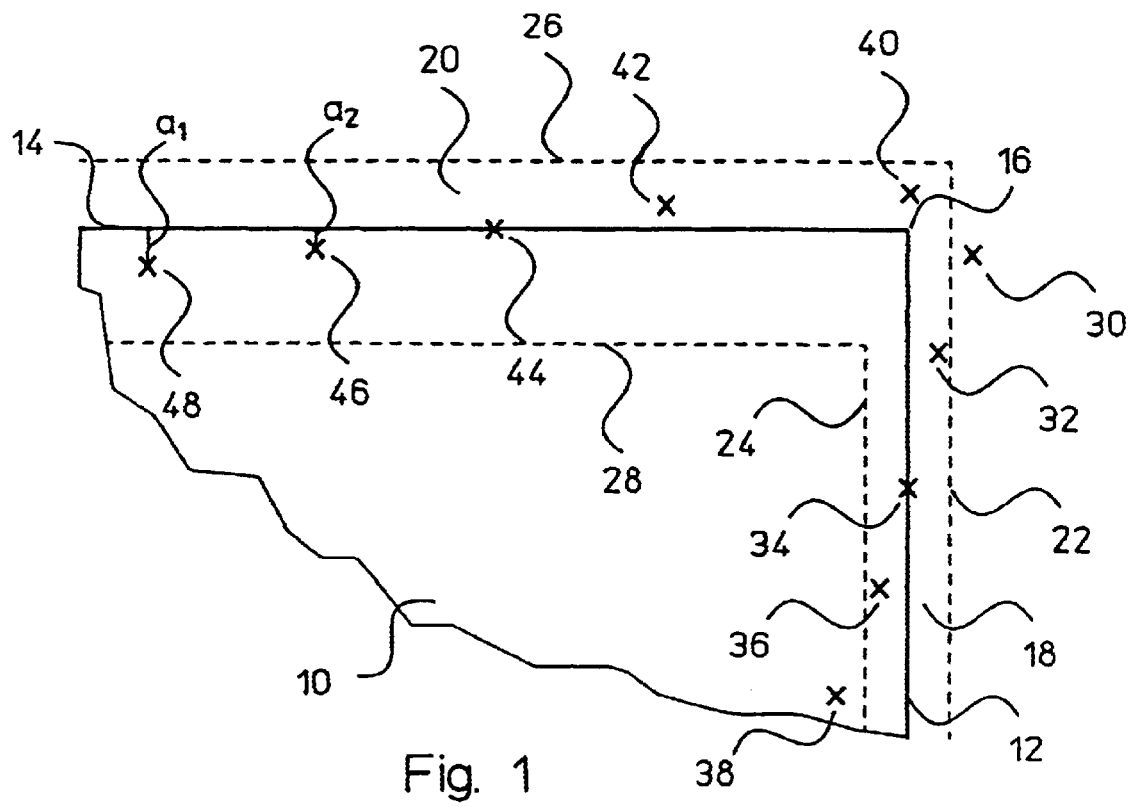

METHOD FOR DETERMINING THE DEVIATIONS IN THE GEOMETRIC MEASUREMENTS AND/OR THE POSITION OF AN OBJECT FROM DEFINED DESIRED VALUES OF SAID GEOMETRIC DIMENSIONS AND/OR POSITION OF THE OBJECT

The invention relates to a method for determining the deviations in the measured geometric dimensions and/or position of an object from defined desired values of said geometric dimensions and/or position of the object. The objects or elements or articles may be of varying dimensions.

Prior art coordinate measuring machines for automatically measuring workpieces already exist. With these methods, the workpieces are scanned continuously, e.g. by means of a tracer finger. The measured values obtained then undergo further processing (DE 35 23 188 A1). Optical measuring systems are also used to determine the coordinate values of, for example, three-dimensional objects. For non-contact scanning an optical measuring head is used: its movements are controlled and its output signals are processed by a computer as the object is scanned. The measured values are analysed using software. The analysis includes, for example, a comparison of the desired/actual dimensions of the measured object. The results are used for quality control purposes, for example. The above method is also used to measure free-form surfaces and compare them with defined desired surfaces. To determine the deviations between desired and actual values, the measured values are adjusted to the desired geometries. The deviations are determined after said adjustment. The deviations are compared with the defined tolerances of the desired surfaces to determine whether the elements or objects are within the tolerance limits, or the points at which tolerance limits are exceeded. Because of the adjustment to the desired geometry, it is impossible to take functional tolerance zones into account.

In measurement technology, adjustment is a well known method where a desired contour and an actual contour are displaced and/or rotated until both contours are aligned "as best as possible". Reference is made in this context to a website on the Internet which, although it can be accessed now, relates to a project carried out between 1994 and 1997, i.e. prior to the filing date. By way of further proof we also enclose offprint October 1996 from "Kontrolle" containing an essay on "Konturscanning" [Contour Scanning] by W. Grebe. The scanning-best fit method is described on the last page of this offprint in a section entitled "Datenauswertung" [Data Evaluation], and in FIG. 7.

With the adjustment technique, the position of a measured actual contour is therefore adjusted by rotation and/or translation in respect of certain optimising parameters so that it more or less coincides with the position of a desired contour as per the pre-defined parameters.

The general aim is to align the desired and actual positions so that the deviations between both contours are minimal. In this sense the optimum position between the desired contour and the actual contour is determined by a process of calculation. This is no academic calculation of measured values, but a genuine reflection of the practical field application which shows the true deviations between desired and actual values, form and dimension, and—where the rotation and displacement parameters are recorded—also the true position between both.

All that is done with the prior art adjustment methods, including for example the "Werth Best Fit" method, is to optimise the position of the desired and actual contours.

A computer-integrated measuring system is know from DE 37 25 347 for determining the deviations in the measured geometric dimensions of an object from defined desired values of said geometric dimensions of the object. An adaptation of the desired values of the geometric dimensions under consideration of the default tolerance values of said desired values has to be implemented before the deviations are determined.

The object underlying the present invention is to develop a method for determining the deviations in the measured geometric dimensions and/or position of an object from the defined desired values for said geometric dimensions and/or position of the object, with which, by improving the adjustment between the measured values, it can be determined with greater accuracy whether defined limit values in the dimensions and/or the position of the measured object are exceeded, so that functional tolerance zones can be taken into account. In accordance with the invention, the problem is substantially solved with the method described at the outset in that before determination of the deviations, the measured values of the geometric dimensions of the object in question and/or the position of the object are adjusted to the desired values whilst taking into account the defined tolerances for the desired values of the geometric dimensions and/or the position of the object. The invention is based on the principle that the measured values, which will be referred to below as the actual values, should be adjusted to the desired values of the object in such a way that none of the measured values, of which there should be as few as possible, are outside the measured value tolerance zone, although inside the tolerance zone it is not necessary for the distances with respect to the desired values to be at their minimum. With the method in accordance with the invention, the quality control results obtained by measuring objects and comparing the measured values with defined desired values are significantly improved. After the adjustment process, it is determined and signalled during the evaluation of just a few tolerance non-conformities when the object in question is optimally positioned within the tolerance zone. In accordance with the invention, the minimum deviation in the measured values from the defined desired values is a criterion that, during the adjustment process, is modified with reference to the deviation in at least one part of the measured values with respect to the tolerance values attributed to the desired values in question. When this modification is carried out, other deviations between desired and actual values may occur in comparison with the adjustment, which focuses only on the desired values. After adjustment, the actual values are checked with regard to their position relative to the desired values and the tolerances attributed to the latter.

With this invention, account is taken during the adjustment process of defined tolerances attributed to individual contour sections of the desired contour. The adjustment process, which consists of rotation and displacement by a computer, for example, then supplies a result which is particularly suitable for checking the fit of the actual contour.

One preferred embodiment provides for the measured values to be attributed point-by-point as actual values to the corresponding desired values, for the differences between the actual values and the tolerances attributed to the corresponding desired value points to be determined, and for the adjustment to be carried out in relation to zero or minimum deviation in the actual values from the tolerances. By tolerances are meant the limit values at each desired value, i.e. the difference between the precise desired value point and the attributed limit value of the tolerance, which is pre-defined and must not be exceeded for whatever reason, e.g. as a quality criterion.

In particular, the adjustment of the actual values to the pre-defined tolerance field is earned out according to the Gaussian method. This ensures that a good adjustment is achieved.

Another preferred embodiment for the adjustment provides for a non-linear optimisation between actual values and tolerance values.

The adjustment method in accordance with the invention is preferably used for objects which, in the three-dimensional space, have one or more arbitrarily oriented contours or planes. The objects may have one or several ruled geometries or free planes in space. The planes or surfaces may have different tolerance zones.

It is preferable if, after the adjustment process, the deviations from the tolerances are calculated and indicated numerically and/or displayed graphically. The method in accordance with the invention is especially suited for aligning three-dimensional coordinate measurements.

Figure 2:
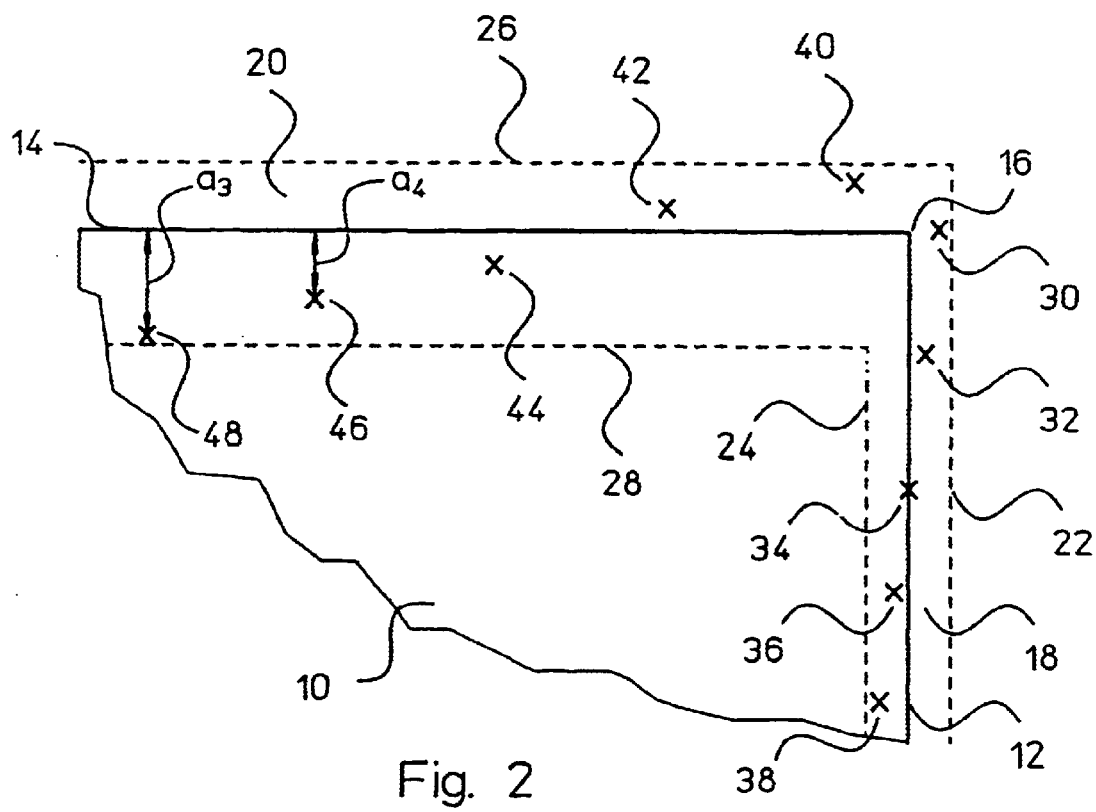

Further details, advantages and features of the invention are shown not only in the claims and in the features they contain—singly and/or in combination—but also in the following description of a preferred embodiment shown in the drawing, in which:

FIG. 1 is a diagrammatic representation of part of an object with the desired values and tolerances attributed to the contours of the object, and measured values which are optimised/adjusted to the contours as desired values and FIG. 2 is a diagrammatic representation of the part of the object shown in FIG. 1 with attributed tolerances and optimisation/adjustment in accordance with the invention whilst taking account of the tolerances.

An object 10, e.g. a workpiece, has as desired values two surfaces 12, 14, running towards each other at a right angle and coming into contact with each other at edge 16. The position of desired values 12, 14 and edge 16 is pre-defined. In addition to the desired values of surfaces 12, 14 and edge 16, which are given for example in the form of coordinates, or an equation or formula, tolerances are also attributed to these desired values. For each surface 12, 14 there are for example different tolerance zones 18, 20, whose limits or distances from the desired values of the surfaces in FIG. 1 are designated as 22 and 24, or 26 and 28 respectively. The distances 22 of the tolerance limits on either side of surface 12 are for example equally large. The distances 26 and 28 of the tolerance limits on either side of surface 14 are for example not equally large.

By scanning the surface of a real object with a coordinate measuring system using a method that is well known per se, a series of measured values can be obtained that are available in digital form, for example, or are converted into this form. These can be adjusted to desired values 12, 14 in such a way that the distances between the measured values, and hence the surfaces of the real objects corresponding to the latter, and the desired values are as small as possible.

FIG. 1 shows five measured values 30, 32, 34, 36, 38 which are attributed to desired surface value 12, and five measured values 40, 42, 44, 46, 48 which are attributed to desired surface value 14. The adjustment of measured values 30 to 48 has been carried out so that the measured values corresponding to the respective real surface in question, taking into account the shape of the surface, are at the smallest possible distance from the desired values. After the adjustment, the position of the measured values with respect to the tolerance zone is checked according to the usual method. In the example shown in FIG. 1, measured values 30 and 38 lie outside the tolerance zone 18. This means that with the adjustment method described above, an unacceptable deviation would be detected and notified if there were a quality check on this object.

With the method for adjusting the measured values in accordance with this invention, the tolerance zones are taken account of during the actual adjustment process itself. The adjustment is carried out so that the actual values are within the tolerance zones as far as possible, e.g. 18 and 22. The adjustment of the measured actual values, e.g. of values 30 to 48, to tolerance zones 18 and 20 is carried out according to the Gaussian method or a non-linear optimisation. The procedure takes place point by point by determining, for each of the desired values, the differences between the actual values and the tolerance limits 22 or 28 attributed to the desired values. These differences are formed on a prefixed basis, e.g. negative=point inside the tolerance, positive= point outside the tolerance. These differences are processed according to the Gaussian method or the non-linear optimisation. FIG. 2 shows the position of actual values 26 to 48 on the basis of the adjustment in accordance with the invention. Identical elements in FIGS. 1 and 2 are designated by the same reference numerals. Using the optimisation of the adjustment in accordance with the invention, all actual values 30 to 48 are within tolerance zones 18 and 20. The distances of some actual values from the attributed desired values are greater than with the method described in connection with FIG. 1; in FIG. 2, for example, distances $a_3$ and $a_4$ of actual values 48 and 46 from the precise desired values defined by surface 14 are greater than the distances $a_1$ and $a_2$ in FIG. 1 of actual values 48 and 46 from the attributed desired values of surface 14. In FIG. 2, however, none of the actual values is outside the tolerance zones.

With the method described in connection with FIG. 1, therefore, a tolerance non-conformity would be detected if deviations were checked because the measured surface actual values are not within the tolerance zones. This can be avoided with the method in accordance with the invention. In the event of a quality check using the measured values of a coordinate measuring system, the method in accordance with the invention therefore prevents objects from being classed as faulty which, if they were adjusted to the desired geometry using a method according to the state of the art, would be classed as such even when there are no faults, or when no measured values are outside the tolerances. The method in accordance with the invention is suitable for objects with planes oriented any way in space. The planes can be ruled-geometric or free planes. Different tolerance zones can be defined for the different planes or part-planes. The deviations, in particular where tolerances are exceeded, are indicated numerically and displayed graphically.

What is claimed is:

1. Method for determining the deviations in the measured geometric dimensions and/or position of an object from defined desired values of said geometric dimensions and/or position of the object, characterised in that before determining the deviations, the measured values of the geometric dimensions and/or the position of the object are adjusted to the desired values whilst taking into account the defined tolerance values of the desired values of the geometric dimensions and/or the position of the object.

2. Method according to claim 1, characterised in that the measured values are attributed as actual values to the corresponding desired values, that the differences between the actual values and the tolerances attributed to the corresponding desired value points are determined, and that the adjustment is carried out in relation to zero or minimum deviation in the actual values from the tolerances.

3. Method according to claim 1, characterised in that the adjustment of the actual values to the pre-defined tolerance field is carried out according to the Gaussian method.

4. Method according to claim 1, characterized in that the adjustment of the actual values to the pre-defined tolerance field is carried out with non-linear optimization.

5. Method according to claim 1, characterised in that the object has one or several contours which are arbitrarily oriented in space.

6. Method according to claim 1, characterised in that the object has one or more ruled-geometric planes and/or free-form planes.

7. Method according to claim 1, characterised in that actual values outside the tolerance zones are registered and the deviations in the actual values from the attributed tolerance zones are determined and displayed numerically and/or graphically.

8. Method according to claim 1, characterised by the alignment of the object where three-dimensional coordinate measurements are used.

9. Method according to claim 1, characterised in that before determining the deviations, a position optimization of the measured values of the geometric dimensions and/or the position of the object is carried out with respect to the position of the desired values whilst taking into account the defined tolerance values for the desired values of the geometric dimensions and/or the position of the object.

* * * * *